United States Patent
Fendt et al.

[11] Patent Number: 5,982,048
[45] Date of Patent: Nov. 9, 1999

[54] PROCEDURE FOR CONNECTING A STATUS DETECTION DEVICE OF A PASSIVE SAFETY SYSTEM FOR MOTOR VEHICLES TO A CONTROL UNIT

[75] Inventors: Günter Fendt; Peter Hora, both of Schrobenhausen; Hans Spies, Pfaffenhofen; Helmut Rauh, Dachau, all of Germany

[73] Assignees: Temic Telefunken microelectronic GmbH, Heilbronn; Bayerische Motorenwerke, Munich, both of Germany

[21] Appl. No.: 08/877,814

[22] Filed: Jun. 18, 1997

[30] Foreign Application Priority Data

Jun. 18, 1996 [DE] Germany ............ 196 24 199

[51] Int. Cl.⁶ .................................. B60R 21/32
[52] U.S. Cl. .................. 307/10.1; 307/9.1; 180/268; 180/271; 280/734; 340/438; 340/667; 701/45
[58] Field of Search ................... 307/9.1, 10.1, 307/10.6, 10.7; 280/735, 728.1, 801.1, 802, 805, 808, 748, 734; 180/268, 270, 271, 272, 273, 286, 289; 701/1, 36, 45, 46, 47; 340/667, 438, 457, 457.1; 200/61.58 B

[56] References Cited

U.S. PATENT DOCUMENTS 5,411,289  5/1995  Smith et al. ............... 280/735
5,531,472  7/1996  Semchena et al. ........... 307/10.1
5,626,359  5/1997  Steffens, Jr. et al. ............ 280/735

FOREIGN PATENT DOCUMENTS 3904668  8/1990  Germany.
4404816  8/1995  Germany.
4420114  12/1995 Germany.

*Primary Examiner*—Albert W. Paladini
*Attorney, Agent, or Firm*—Venable; George H. Spencer; Catherine M. Voorhees

[57] ABSTRACT

The invention concerns a procedure for selectively connecting a status detection device—from a group of such devices based on different physical action principles, in particular belt buckle status detection, and seat occupation detection, within a passive safety system for motor vehicles, in particular an airbag system, and/or a belt pretensioning system,—to the signal input of a control unit, using a single wire connection, by causing the control unit to activate an appropriate current/voltage supply in accordance with the physical action principle, and by appropriately processing the signals generated by the status detection device, which signals will then be fed to the control unit for evaluation. Furthermore, an interface circuit is specified for implementing the procedure according to the invention.

11 Claims, 3 Drawing Sheets

PROCEDURE FOR CONNECTING A STATUS DETECTION DEVICE OF A PASSIVE SAFETY SYSTEM FOR MOTOR VEHICLES TO A CONTROL UNIT

BACKGROUND OF THE INVENTION

The invention concerns a procedure for connecting a status detection device of a passive safety system for motor vehicles to a control unit.

Motor vehicles are increasingly equipped with safety systems such as airbag systems, belt tensioning systems, and rollbar systems. As these systems are all critical to safety, the requirements with regard to their reliability are particularly stringent. It is important here that the status detection devices of add-on units for these safety systems—such as, for example, passenger seat occupation detection and belt buckle status detection—operate safely and provide reliable status information, in this way ensuring a sufficient degree of protection for vehicle occupants in the event of an accident.

Thus it is known that a micro-mechanical belt contact switch is used for belt buckle status detection; however, this switch has minor defects with regard to its reliability. Therefore, in order to improve such belt buckle status detection, devices—preferably Hall sensors—were developed which operate without contact and thus also without any wear.

However, if automotive manufacturers transitionally use systems featuring micro-mechanical belt contact switches as well as Hall sensors, these systems require different methods respective processing of the signals containing the status information in order to enable these signals to be evaluated by the control unit of the safety system.

SUMMARY OF THE INVENTION

The object of the invention is to provide a procedure by means of which different status detection devices—that operate on the basis of different physical action principles—can be connected in a simple and low-cost manner to the control unit of the safety system such that the signal generated by the respective connected status detection device can be fed to the control unit of the safety system in a format suitable for evaluation.

According to the invention—and by means of a single wire connection in relation to the physical action principle of the status detection device to be connected—the control unit will activate a voltage source or a voltage-stabilized current source for generating an operating voltage or an operating current, while at the same time the signal supplied by the status detection device (which signal contains the status information) is processed in accordance with the physical action principle, and the processed signal then evaluated by the control unit.

Using the procedure according to the invention, it is now possible to respond very flexibly to the type of status detection device connected.

In an advantageous embodiment of the invention the signal will be processed into an analog or digital signal in relation to the physical action principle of the status detection device. Preferably, these signals will then be fed to the analog or digital input of the control unit. Advantageously, this can be used to activate by means of software—preferably by means of a software-controlled switch—the relevant control unit input.

Furthermore, in another advantageous application of the invention, status detection devices of a first and a second type are provided such that the status detection device of the first type operates by means of a mechanical action principle for status detection, in particular by means of a micro-mechanical switch, while the status detection device of the second type operates by means of a non-mechanical action principle, in particular by means of Hall sensors, infrared sensors, piezoelectric, magnetostrictive, electrodynamic, capacitive, or piezo-resistive sensors.

Furthermore, in the case of a connected status detection device of the first type, the control unit will activate the voltage source, and the analog signal is fed to the analog input of the control unit.

However, in the case of a connected status detection device of the second type, the control unit will activate the voltage-stabilized current source, and the digital signal is fed to the digital input of the control unit.

In order to implement the procedure according to the invention, an interface circuit will be specified which is connected to the status detection device by means of the single wire connection, and which features a voltage source switchable by the control unit, which voltage source—when activated—will supply a status detection device of the first type with an operating voltage, if necessary; the same interface circuit will also feature a voltage-stabilized current source switchable by the control unit, which current source—when activated—will supply a status detection device of the second type with an operating voltage, if necessary.

In this way an interface circuit is set up that can be used, for example, to implement a belt buckle status detection device which can either feature a micro-mechanical belt buckle contact switch or a Hall sensor for status detection; in this way large production quantities can be achieved that lead to cost reductions but at the same time allow automotive manufacturers to be flexible with regard to installation variants.

In a further embodiment of the interface circuit, circuit components are provided which, in the case of a connected status detection device of the first type, will be connected to the analog input of the control unit, while at the same time a comparative circuit for generating a digital signal will be implemented in the interface circuit; in the case of a connected status detection device of the second type, this comparative circuit will be connected to the digital input of the control unit, with the comparative circuit comparing a voltage potential—generated along the single wire connection—to a reference voltage.

Advantageously, the proposed interface circuit will thus be able to process analog as well as digital signals as its input signals.

Additionally, a further application of the interface circuit according to the invention provides for circuit components to be made up of a resistor network, and for the comparative circuit to be also made up of a resistor network and a comparator, with the same resistor network being used in both cases respectively.

This provides for a simple and thus cost-favorable setup of the interface circuit.

Finally, the single-wire connection used for the interface circuit represents a contact pin of a connector.

BRIEF DESCRIPTION OF THE DRAWINGS

The implementation of the procedure according to the invention by means of an interface circuit is to be shown and explained below in connection with the drawings, in which.

DESCRIPTION OF THE PREFERRED EMBODIMENTS

Figure 1:
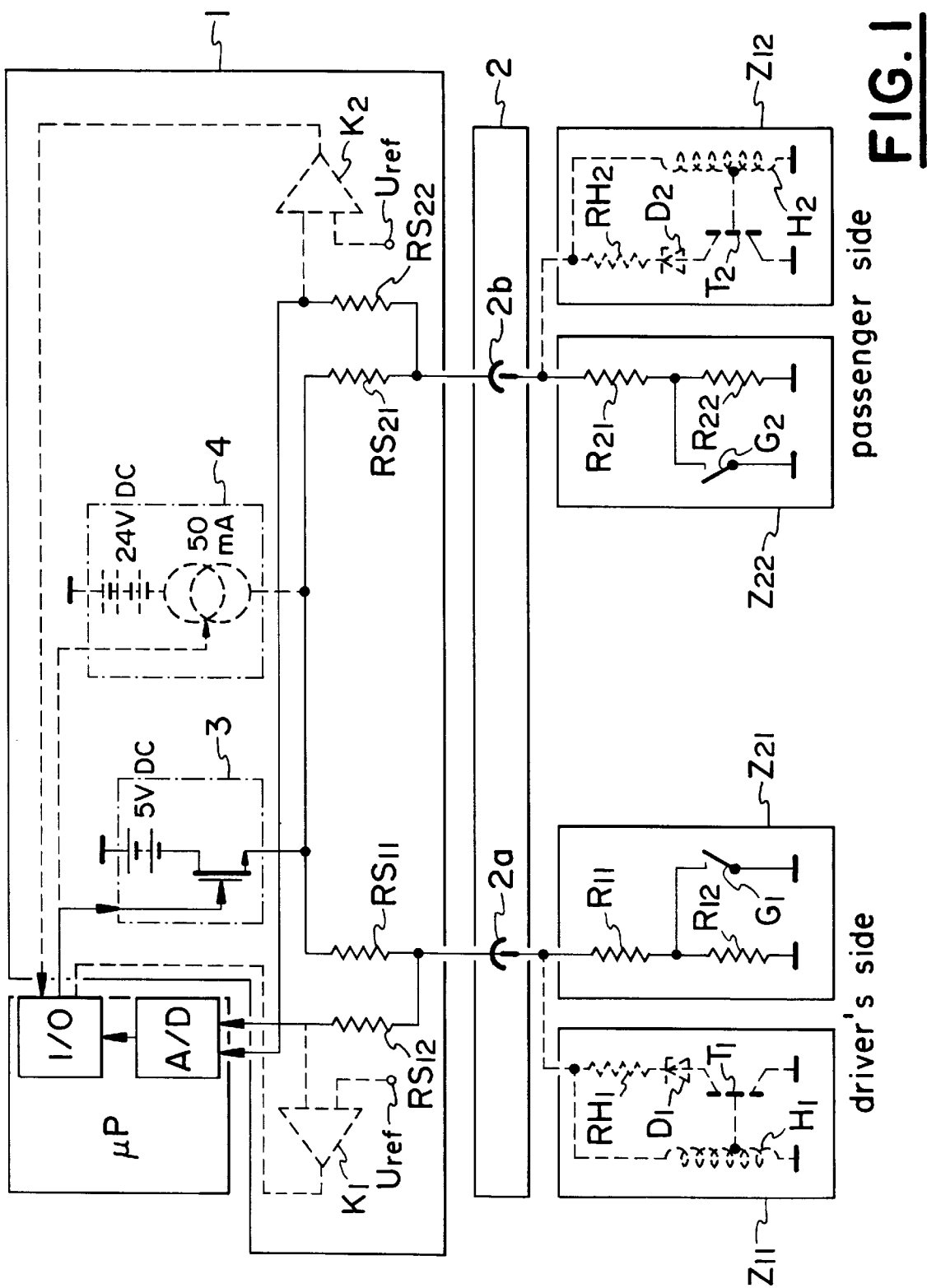
FIG. 1 is a circuit diagram of an interface circuit for connecting various different belt buckle status detection devices.

An interface circuit 1 according to FIG. 1 comprises a voltage source 3, a voltage-stabilized current source 4, two comparators $K_1$ and $K_2$ as well as four resistors $R_{S11}$, $R_{S12}$, $R_{S21}$, and $R_{S22}$. This interface circuit 1 is connected via contact pins 2a and 2b of a plug connection 2 with one status detection device $Z_{11}$ or $Z_{21}$ and $Z_{22}$ or $Z_{12}$, respectively. These status detection devices $Z_{11}$ to $Z_{22}$ represent belt buckle status detection devices—$Z_{11}$ and $Z_{21}$ or $Z_{12}$ and $Z_{22}$ for the driver or passenger sides—based on different physical action principles. Thus the two status detection devices $Z_{21}$ and $Z_{22}$ contain a micro-mechanical belt buckle contact switch $G_1$ or $G_2$, which—with the belt buckle engaged—bridges a further resistor $R_{12}$ or $R_{22}$ connected in series to a resistor $R_{11}$ or $R_{21}$. The operating voltage required for this purpose will be provided by the 5 V voltage source 3 which is connected via resistor $R_{S11}$ to contact pin 2a, or via resistor $R_{S21}$ to contact pin 2b.

The controllability of voltage source 3 will be implemented by means of a semiconductor switch which is controlled by means of an input/output unit I/O of a control unit, in particular by a microprocessor $\mu P$. This microprocessor $\mu P$ represents the control unit of a safety system such as—for example—an airbag system.

When this voltage source 3 is in its activated condition, the voltage signal generated on contact pins 2a or 2b will be fed via resistor $R_{S12}$ or $R_{S22}$ for evaluation to an analog input of an A/D converter of the microprocessor $\mu P$ where this voltage signal will be digitized before an actual evaluation is carried out. As the status detection device connected to contact pin 2a detects only the belt buckle status on the driver's side, and as the status detection device connected to contact pin 2b only detects the belt buckle status on the passenger side, the microprocessor $\mu P$ will be provided with the information whether driver or passenger have put on their respective safety belts, in order to decide whether it is necessary to trigger the passenger airbag and any other additional safety devices.

The broken line illustration in FIG. 1 shows that it is possible to connect the status detection device $Z_{11}$ or $Z_{12}$—instead of the status detection device $Z_{21}$ or $Z_{22}$—to contact pins 2a or 2b of plug connection 2, depending on the requirements of the respective automotive manufacturer.

These status detection devices $Z_{11}$ and $Z_{12}$ comprise a Hall sensor $H_1$ or $H_2$ which, when the belt buckle is engaged, drives a transistor $T_1$ or $T_2$. In order to ensure that the system operates in this way, the voltage-stabilized current source 4—instead of voltage source 3—will be activated by the microprocessor $\mu P$; this voltage-stabilized current source 4 will, for instance, be fed by a 24 V voltage source and can supply a 50 mA current. On the one hand, such an operating current feeds Hall sensors $H_1$ or $H_2$, which take up a maximum current of 10 mA, as well as a circuit controlled by transistors $T_1$ or $T_2$, comprising—for example—a zener diode $D_1$ or $D_2$ and a resistor $R_{H1}$ or $R_{H2}$. Depending an actual belt buckle status, a voltage potential will be generated on contact pins 2a or 2b; this voltage potential is fed via the resistor $R_{S12}$ or $R_{S22}$ to the one input of a comparator $K_1$ or $K_2$. At the other input of this comparator $K_1$ or $K_2$ a reference voltage, preferably 12 V, will be applied. This will cause a digital signal to appear at the output of this comparator $K_1$ or $K_2$, which will indicate the belt buckle status and, for evaluation, be fed to the digital input of the microprocessor $\mu P$. The digital input leads to the input/output unit I/O of the microprocessor $\mu P$.

Figure 3:
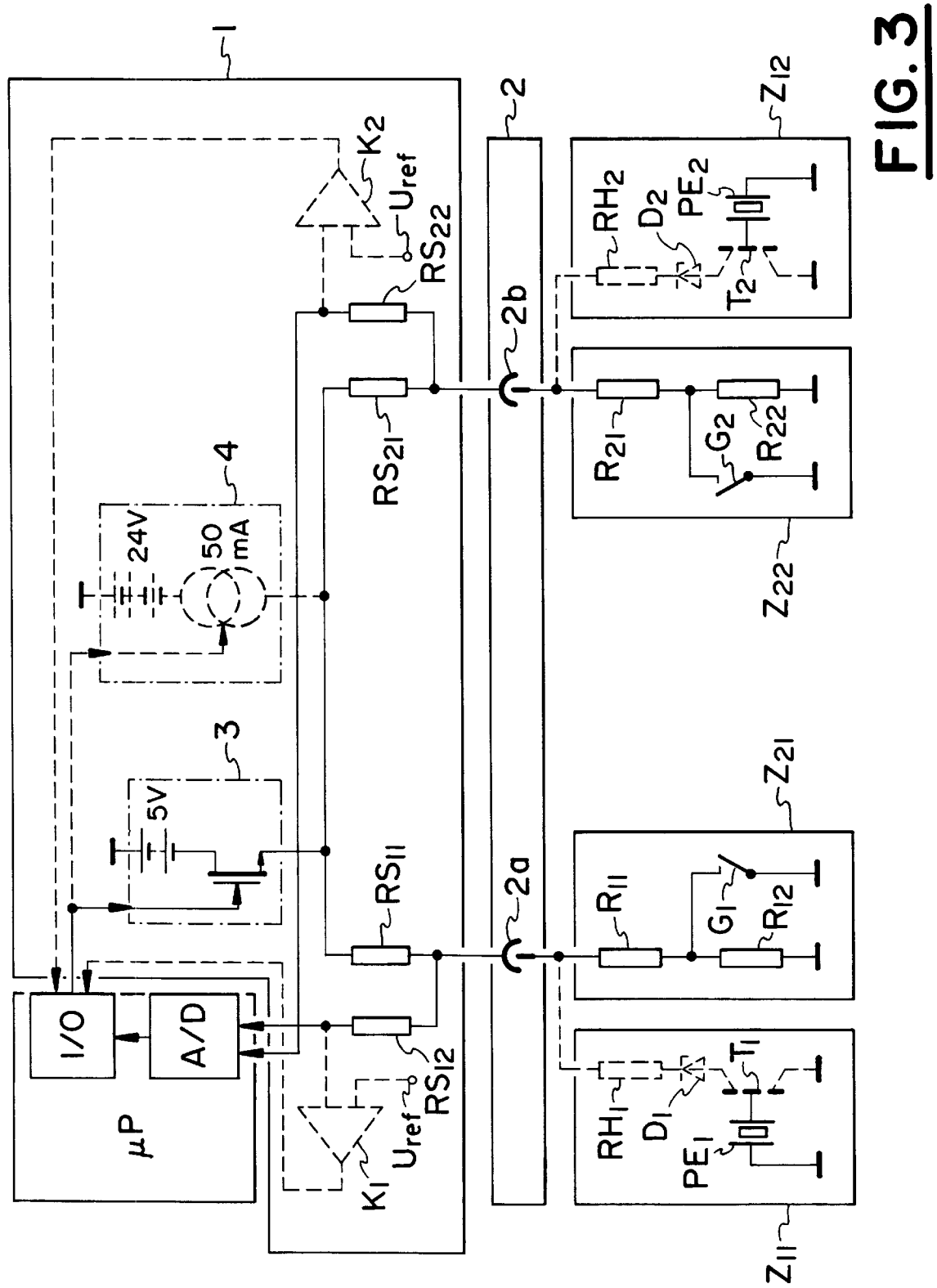
FIG. 3 is a circuit diagram similar to FIG. 1.

Instead of the Hall sensor H1 or H2, a piezoelectric sensor $PE_1$ or $PE_2$ could be employed, as shown in FIG. 3, which could drive the respective transistor $T_1$ or $T_2$ when a belt buckle is engaged. Similarly, status detection devices $Z_{11}$ and $Z_{12}$ may include magnetostrictive, electrodynamic, capacitive or piezoresistive sensors.

By means of this interface circuit 1, it is therefore possible to connect status detection devices via the single wire connection 2a or 2b to the microprocessor $\mu P$, where these status detection devices respectively operate in accordance with different action principles. According to the type of the status detection device currently activated, the control unit $\mu P$ will be set—by means of a software-controlled switch—such that either the voltage source 3 or the voltage-stabilized current source 4 will be activated, in respect of which activation the signal applied to the relevant analog or digital input will be evaluated.

Finally, the interface circuit 1 according to FIG. 1 also has the advantage that, as an input circuit, it can evaluate analog as well as digital signals and may thus be justifiably designated as a multifunctional interface.

The table below states an example for dimensioning the components of interface circuit 1 and status detection devices $Z_{11}$, $Z_{12}$, $Z_{21}$, and $Z_{22}$;

| $R_{S11}$, $R_{S21}$: | 619Ω | $R_{11}$, $R_{21}$: | 100Ω |
|---|---|---|---|
| $R_{S12}$, $R_{S22}$: | 4.7Ω | $R_{12}$, $R_{22}$: | 300Ω |
| $U_{ref} =$ | 12 V | $R_{H1}$, $R_{H2}$: | 100Ω |
|  |  | $D_1$, $D_2$: $U_Z =$ | 6.2 V |

Figure 2:
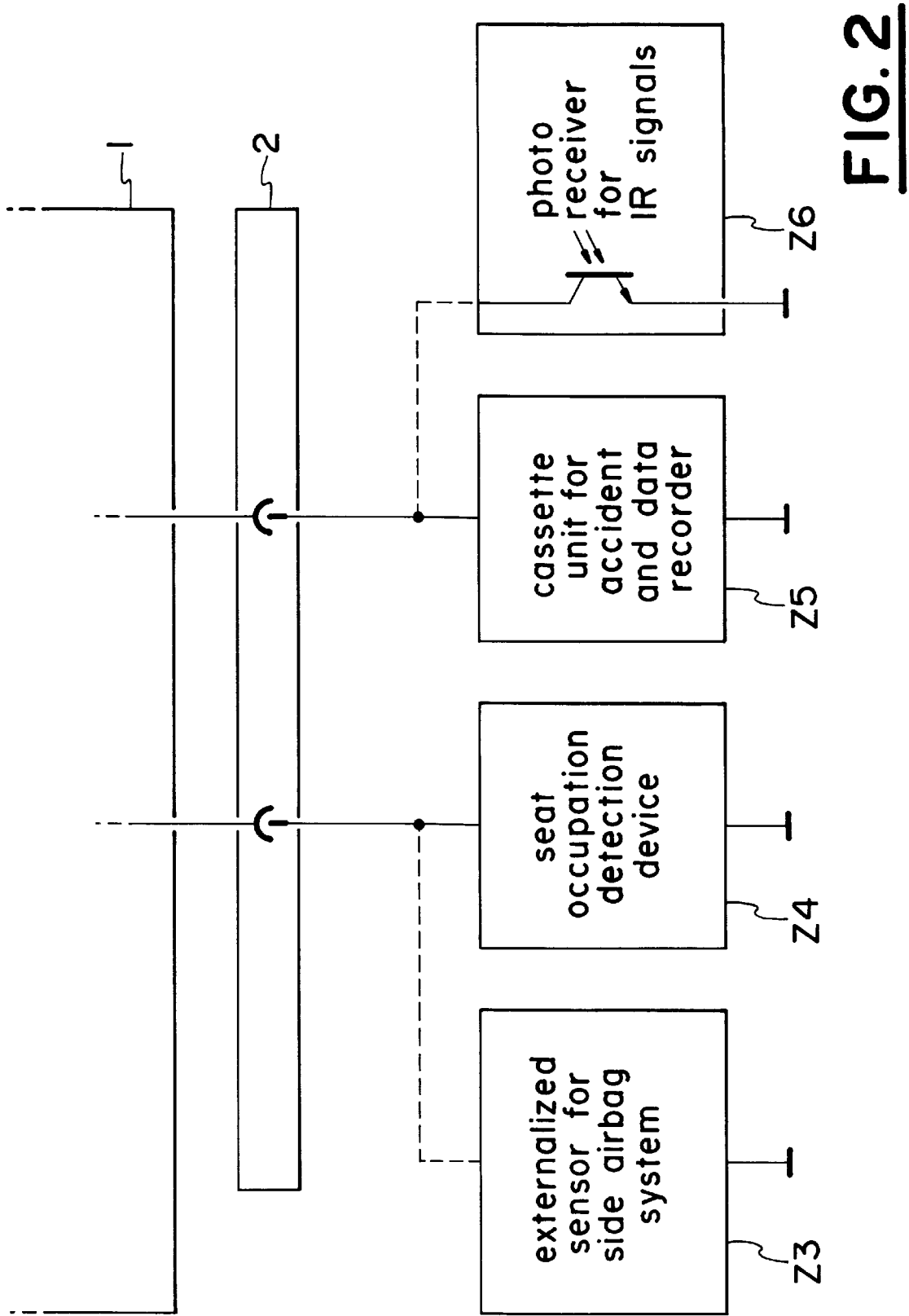
FIG. 2 is a circuit diagram of the interface circuit according to FIG. 1 complete with the status detection devices of further add-on functions.

In addition to the transmission of belt buckle status information, the interface circuit 1 is also capable of transmitting status information from other add-on devices of a safety system. Thus FIG. 2 shows, for example, that it is also possible to transmit the status data of a seat occupation detection device $Z_4$—in particular a child seat occupation detection device—, as well as the data from an externalized system such as—for example—a side impact sensor $Z_3$, the data from a recording unit of an accident and data recorder $Z_5$, and also the data from a photo receiver $Z_6$ for infrared signals. To this end, dimensioning of the interface circuit 1 must be adapted to the respective status detection devices.

The interface circuit 1 shown in FIG. 1 only has a single wire connection to the status detection devices. However, a multi-wire connection is also conceivable where for example the ground wire is used as a return line.

What is claimed is:

1. A passive motor vehicle security system comprising:
   a control unit;
   an interface circuit connected to the control unit, said interface circuit having a voltage source for generating an operating voltage and a voltage-stabilized current source for generating an operating current; and
   a status detection device for detecting status information for the vehicle security system, connected to and supplying an electrical signal containing said status information to said interface circuit, said status detection device being based on one of a mechanical action and a non-mechanical action, and said interface circuit supplies either an operating voltage or an operating current to said status detection device depending on the action of the status detection device wherein said control unit activates one of the voltage source or the voltage-stabilized current source depending on the action of the status detection device and said interface circuit processes the signal which contains status information and subsequently transmits this processed signal to the control unit for evaluation.

2. A passive motor vehicle security system according to claim 1 wherein the processed signal will be converted into an analog or digital signal depending on the action of the status detection device.

3. A passive motor vehicle security system according to claim 2 wherein the control unit has an analog input and a digital input and a digital signal is fed to the digital input and an analog signal is fed to the analog input.

4. A passive motor vehicle security system according to claim 3 wherein a status detection device based on a mechanical action is operated by means of a micro-mechanical switch and a status detection device based on a non-mechanical action is operated by one of a Hall sensor, an infrared sensor, and a piezoelectric, magnetostrictive, electrodynamic, capacitive or piezo-resistive sensor.

5. A passive motor vehicle security system according to claim 4 wherein, in the case of a status detection device based on a mechanical action, the control unit will activate the voltage source, and the signal is converted into an analog signal.

6. A passive motor vehicle security system according to claim 4 wherein, in the case of a status detection device based on a non-mechanical action, the control unit will activate the voltage-stabilized current source, and the signal is converted into a digital signal.

7. A passive motor vehicle security system according to claim 4 wherein said interface circuit is connected to the status detection device by a multi-wire connection.

8. A passive motor vehicle security system according to claim 5 wherein said interface circuit is connected to said status detection device by means of a single wire.

9. A passive motor vehicle security system according to claim 8 wherein the interface circuit further comprises circuit components which, in the case of a connected status detection device based on mechanical action, are connected to the analog input of the control unit, and a comparative circuit for generating a digital circuit which, in the case of a connected status detection device based on non-mechanical action, is connected to the digital input of the control unit, said comparative circuit comparing a voltage potential generated along the single wire connection to a reference voltage.

10. A passive motor vehicle security system according to claim 9 wherein the circuit components are made up of a resistor network, and the comparative circuit includes the resistor network of the circuit components and a comparator.

11. A passive motor vehicle security system according to claim 10 further comprising a contact pin of a plug connection which is used as the single wire connection.

* * * * *